Pollock & Bliven,
Cheese Cutter.
Nº 23,492.      Patented Apr. 5, 1859.
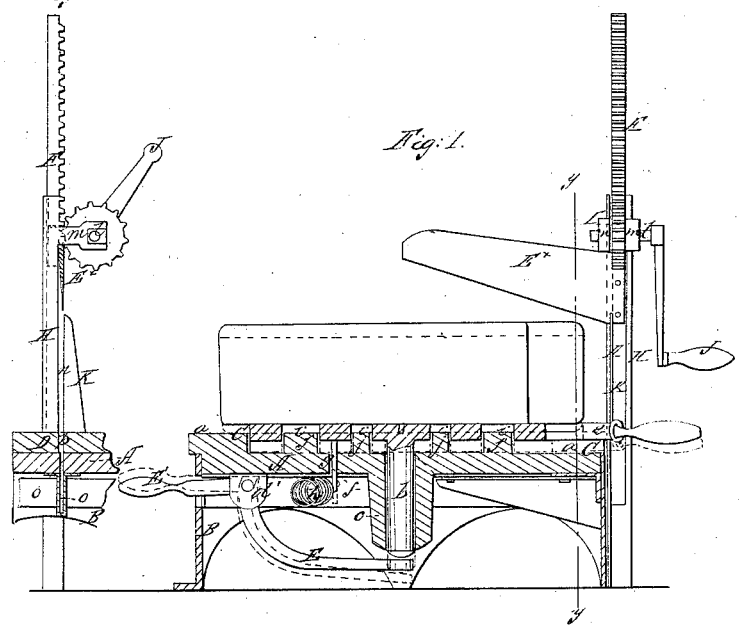
Witnesses:
Inventors:
Thomas H. Pollock
Daniel W. Bliven

UNITED STATES PATENT OFFICE.

THOS. H. POLLOCK AND DANL. BLIVEN, OF GREENVILLE, CONNECTICUT.

CHEESE-CUTTER.

Specification of Letters Patent No. 23,492, dated April 5, 1859.

*To all whom it may concern:*

Be it known that we, THOMAS H. POLLOCK and DANIEL BLIVEN, both of Greenville, in the county of New London and State of Connecticut, have invented a new and Improved Cheese-Cutter; and we do hereby declare that the following is a full, clear, and exact description of the same, reference being had to the annexed drawings, making a part of this specification, in which—

Figure 1, represents a vertical section of a cheese cutter constructed according to our improvements, the line $x$, $x$, Fig. 2, indicating the line of section. Fig. 2, is a plan or top view of ditto, and Fig. 3, is a vertical section taken in the line $y$, $y$, Fig. 1.

Similar letters of reference in the three views indicate corresponding parts.

This invention consists in arranging a lifting turn-table in such relation to a stationary platform that a cheese placed on the latter can be lifted clear from the same and turned by means of the lifting table, which latter when the cheese has been turned sufficiently, is let down again so that the cheese rests on the platform ready for a fresh cut and the turntable is so arranged that the same goes back to its original position, as soon as the hand relaxes, the knife being attached to a rack which is moved up and down in a suitable guide which is rigidly fastened to the base or frame on which the platform rests and the knife is placed in such a position that its edge enters the cheese gradually as the rack is forced down by the pinion, whereby the operation of cutting is greatly facilitated.

To enable those skilled in the art to fully understand, use and construct our cheese cutter we will proceed to describe it.

A, is a platform which rests on a base or frame B, and attached to the outer edge of the platform is a rim $a$, so that a circular recess C, is formed in which the turntable D, rests. This table turns on a central pin $b$, which has its bearing in a socket formed by a boss $c$, which is attached to the under side of the platform A, and this pin extends sufficiently through the boss $c$, that the same together with the table D, can be lifted up by means of a lever E, which has its fulcrum in two ears $d'$, which are rigidly attached to the under side of the platform A, and this lever is operated by means of a handle E', which extends beyond the platform as clearly represented in Figs. 1 and 2. A certain space $d$, is cut out of the rim $a$, in which the handle $e$, moves by which the turn table D, is operated, and the amount of motion which can be given to the turn-table depends upon the size of this space $d$. Attached to the under side of the turn table is an arm $f$, which extends through a slot $g$, in the platform and a spiral spring $h$, which is fastened to the side of the base B, is hitched to this arm $f$, so as to bring the turn table back to its original position whenever the same is left free to follow the action of the spring. The turntable D, is provided with several slots $i$, which fit over projections $j$, which are rigidly attached to the upper surface of the platform A, and these projections $j$, as well as the rim $a$, are somewhat higher than the turn-table D, so that a cheese placed on the platform rests on the rim $a$, and on the projections $j$, or on the latter alone, if the table D, is down.

E*, is the knife which is attached to a rack F', which slides up and down in a groove $k$, made into a vertical standard H, which is rigidly attached to the side of the base B, and this rack is moved up and down by means of a pinion I, which is fastened to an arbor $l$, which has its bearings in two ears $m$, which are attached to the standard H, and a handle J, serves to operate the pinion I. The knife is guided in its descent by a slot $n$, left between the standard H and an additional plate K, which is rigidly attached to the side of the base B, and the platform A, and the base B, is provided with slots $o$, and a corresponding slot $p$, in the turn table coincides with the slot $e$, if the turn table is left to follow the action of the spring $h$. The knife is attached to the rack so that the cutting edge forms an obtuse angle with the same; and the slots $p$, and $o$, in the table D, and in the platform are of such a depth that the cutting edge descends below the surface of the platform when the knife is forced all the way down.

The operation is as follows:—The cheese is placed on the platform A, as represented in Figs. 1, and 2, in red outlines and the knife is forced down by means of the pinion and rack, so that an incision is made in the cheese from the center to the circumference. After the knife has been raised again the turn table D, is lifted up by means of the lever F, into a position represented in Fig. 1, in black, and the cheese which originally was supported by the rim *a*, and by the projections *j*, of the platform, rests now entirely on the table D, so that the same turns together with the table, if the latter is turned into a position shown in Fig. 2, in red outlines. The table D, is now lowered so that the cheese comes to lie on the rim *a*, and on the projections *j*, and the handle E', is released, so that the table turns back to its original position and the cheese, which of course don't turn back, is ready for a fresh cut, and a slice is cut out, the size of which depends on the amount of motion given to the table D, in turning the same. It will be noticed that the quantity of motion which can be given to the turn table, depends upon the space *d*, cut out of the rim *a*, but if the slice of cheese obtained by lifting the table and by turning the same once, should not be large enough the size of the slice may be increased at pleasure by lifting and turning the table several times before the knife is brought down.

The cutting operation is greatly facilitated by reason of the inclined position of the cutting edge of the knife, as by these means the knife is drawn through the cheese more in the manner of cutting by hand, and as the cutting edge of the knife descends into the slots *p*, and *o*, the cheese is cut clear through on every place.

This cheese cutter is adapted to all sizes of cheese, as the cheese if large enough is, supported by the rim, *a*, on the platform or if too small it rests on the projections *j*, but in every case the operation is the same, as the turn table works free and independent from the cheese until it (the table) is lifted up.

What we claim as new and desire to secure by Letters Patent, is,

1. The platform A, being provided with a rim *a*, and with projections *j*, in combination with the turn table D, or its equivalent to operate substantially as and for the purpose specified.

2. And we also claim the arrangement of the knife E*, the cutting edge of which makes an obtuse angle with the rack to which it is attached, and which operates in combination with the slots *p* and *o*, substantially in the manner herein specified.

THOMAS H. POLLOCK.
DANIEL W. BLIVEN.

Witnesses:
T. C. GORDON,
PAUL B. GREEN.